Sept. 6, 1966  G. BORRINI  3,270,806
COOLING DEVICE FOR EXTRUDED GOODS OF THERMOPLASTIC MATERIALS
Filed July 15, 1964
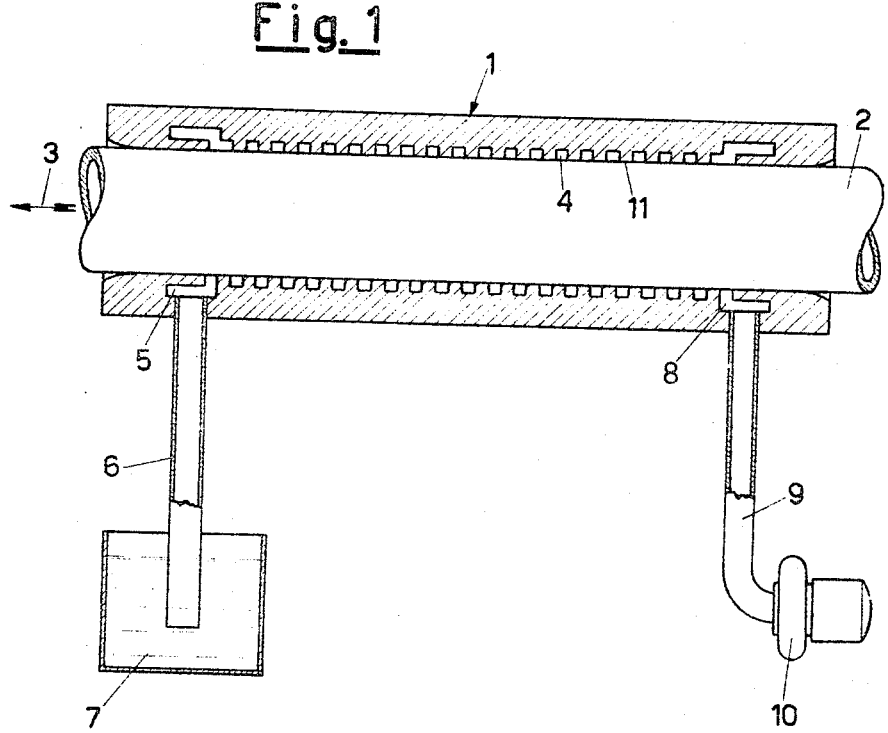
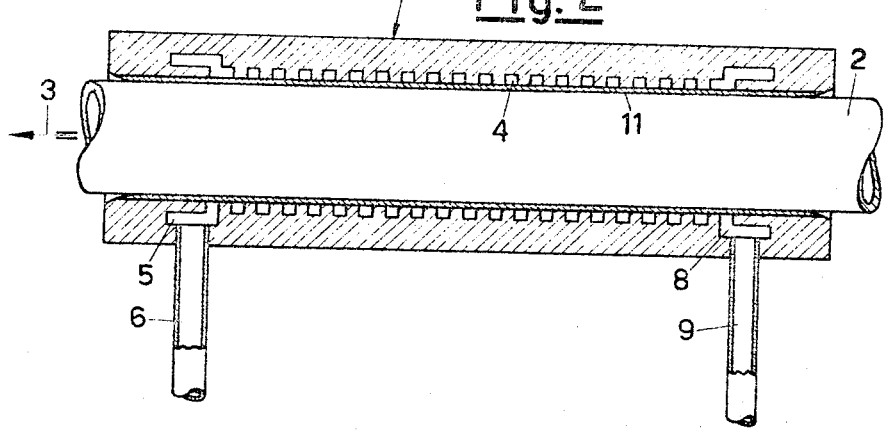

United States Patent Office 3,270,806
Patented Sept. 6, 1966

3,270,806
COOLING DEVICE FOR EXTRUDED GOODS OF THERMOPLASTIC MATERIALS
Geo Borrini, Milan, Italy, assignor to Amut S.p.A., Novara-Veveri, Italy, a company of the Italian Republic
Filed July 15, 1964, Ser. No. 382,817
Claims priority, application Italy, Oct. 4, 1963, 20,374/63
2 Claims. (Cl. 165—156)

The present invention relates to a device for cooling shaped sections, more particularly hollow shaped sections, obtained by extrusion of thermoplastic materials.

It is known that it is necessary to cause said shaped sections, immediately on extrusion, through an implement capable of imparting thereto the final external shape and of cooling the extrusion. It is also necessary that the shaped section, which may be either an open rolled section or a hollow one, may perfectly adhere to the surface of said implement intended for cooling and finally shaping the extrusion. For this purpose resort is made either to blowing pressurized air within the hollow extrudate or to giving rise to a negative pressure outside the extrudate. Cooling can also be carried out along with the shaping operation while cooling the extruding die by circulating water externally thereof. It is likewise known that such a procedure limits the extrusion velocity as a function of the ability to cool the extrusion during progress of the shaping operation.

It is an object of the present invention to provide a cooling device capable of giving a cooling effect, simultaneously with the shaping of the outer surface of the extrusion, which cooling effect is much more intense than that known in the prior art. Such cooling is, moreover, independent of the ambient temperature and of the temperature of the working fluid.

The teachings of the present invention are based on the exploitation of heat of vaporization. As is known, a liquid is brought to a boil, i.e. it is vaporized, at a temperature which can be selected beforehand, once the nature of the liquid, and its ambient pressure are known. The temperature of vaporization is a function of the pressure and this can also be lower than atmospheric pressure.

It is also known that during boiling the temperature of the liquid stays constant and the heat build-up within the liquid is remarkable: water, for example, absorbs about 600 calories per kilogram.

According to the invention, the device comprises a hollow space having a constant cross-sectional area intended to receive the extrusion sliding thereinto, which hollow space is surrounded by a cavity wherein a liquid is introduced and wherefrom the vaporized liquid is withdrawn. Said hollow space and said cavity can also mutually communicate, so that said liquid may be allowed to flow in contact with the extrusion to be cooled.

Two embodiments of the device according to the invention will be now described, by way of example only and without implying any limitations, since the constructional details, in any case based on the basic concept of the invention, may be varied without departing from the scope thereof.

For the disclosure, reference is had to the accompanying drawing, wherein:

FIGURE 1 is a diagrammatical longitudinal cross-sectional view of an embodiment of the invention;
FIGURE 2 is a diagrammatical longitudinal cross-sectional view of an alternative embodiment of the invention.

In FIG. 1 there is shown a tubular body 1 of the device according to the invention, which can have any desired cross-sectional shape, suitable for the passage of a desired extruded item, and within which is passed a thermoplastic extrusion 2, coming from an extruder (not shown) in the direction of the arrow 3, and drawn by a take-up device of conventional design (not shown).

The body 1 is preferably metallic: it has in its interior a cavity formed by a helical channel 4 which is open towards the inside of the body 1, i.e. towards the extrusion 2. Such a cavity can also be formed by a plurality of circular grooves connected to one another, for example, by means of manifold grooves, or it can consist of a plurality of helical grooves like a many-started screw-thread, having a square screw-thread or a thread of any other shape.

The cavities or channels can also be grouped and have an oblique trend (such as, for example, the spider-marks of the journals for shafts) or a meander-like trend or any other trend, provided that they be all interconnected. The cavities or channels are connected at an end 5 which is at a distant location with respect to the extruder, to a piping 6 for sucking a liquid contained in a tank or reservoir 7, whereas at the opposite end 8 the channels are connected to a piping 9 leading to a sucking pump 10, for example a metering pump, a gear pump or the like.

The extrusion 2 is forced, as aforesaid, to move in the direction of the arrow 3, through the device, as soon as it is expelled from the extruder: the extrusion 2, when passing through the body 1, creates, concurrently with the cavity 4 a single closed conduit establishing communication between the ends 5 and 8, and thus the liquid of the tank 7, through the conduits 6, 4, 9 can be sucked by the pump 10.

Under such circumstances the extrusion 2 adheres, due to the force exerted by the atmospheric pressure, to the parts 11 between the hollow space 4 of the body 1 towards the extruder and the sucked liquid will vaporize within said conduit, being brought to a boil at a temperature generated by the negative pressure of pump 10, thus withdrawing heat of vaporization from the liquid and cooling the extrusion.

The cylindrical surface 11, in the drawing, is of circular cross-section and has a preselected size, to adjust the external dimensions of the extrusion 2 to the preselected values.

As is known, in the case in which the liquid is water, one obtains that at a pressure of 0.5 kgs./sq. cm., the temperature will be stabilized at 32° C. It is obvious that at this stage the pump 10 will suck water vapor and thus it must be suited to this purpose. By using, instead of water, other liquids having a lower boling point, it will be possible to obtain lower temperatures, also sub-zero temperatures.

In the embodiment depicted in FIG. 2, the cavity 4 is formed by a closed helical channel so that water passing therethrough does not come into contact with the extrusion 2; the latter is kept in contact with the surface 11 by sucking air through openings formed within the same surface in any known manner, or also by blowing compressed air within the extrusion 2 in any conventional manner.

Such being the case, the cavity 4 could also be differently shaped, for example it could be a continuous annular surface coaxial with the surface 11, by inserting a throttling valve in the pipe 6 to create the desired negative pressure within said chamber.

The embodiment described above is, of course, but an example: an external cooling device for the whole assembly could also be provided, especially in correspondence with the inlet end.

I claim:
1. A device for cooling a heated body in a plastic state comprising a member having an inner longitudinal bore, said heated body being advanced longitudinally through said bore, said member having a cavity opening into said bore and extending around said bore and longitudinally thereof, supply means for supplying a cooling fluid in liquid form to said cavity, and a vapor pump for advancing the cooling fluid through said cavity in a direction opposite to that of the advancement of the heated body while establishing a negative pressure of the fluid in said cavity, said fluid being introduced into said cavity from said supply means in a liquid state at a temperature at which the fluid will vaporize under its negative pressure and the heat of said heated body and be withdrawn from a cavity by said vapor pump in a vapor state, said bore being substantially the same size and shape as that of the heated body such that as said heated body is advanced through the bore, the heated body contacts the member at the inner bore under the influence of the negative pressure of the cooling fluid.

2. A device as claimed in claim 1 wherein said cavity is constituted by a helical groove having one end connected to said supply means and an opposite end connected to said vapor pump.

References Cited by the Examiner
UNITED STATES PATENTS

| | | | |
|---|---|---|---|
| 1,905,811 | 4/1933 | Culver | 165—47 X |
| 2,445,115 | 7/1948 | Hanrahan | 165—156 X |
| 2,549,569 | 4/1951 | Bradley | 18—12 X |
| 2,604,500 | 7/1952 | Roning | 165—47 X |
| 2,653,348 | 9/1953 | Elgin et al. | 165—87 X |
| 2,688,770 | 9/1954 | Henning | 165—87 X |
| 2,774,991 | 12/1956 | McCurdy et al. | 18—12 X |
| 2,900,168 | 8/1959 | Nyborg | 165—154 X |

ROBERT A. O'LEARY, *Primary Examiner.*

FREDERICK L. MATTESON, JR., *Examiner.*

M. A. ANTONAKAS, *Assistant Examiner.*